:(12) United States Patent
Randa et al.

(10) Patent No.: US 9,512,951 B2
(45) Date of Patent: Dec. 6, 2016

(54) PIPE SLITTING APPARATUS

(71) Applicant: Earth Tool Company LLC, Oconomowoc, WI (US)

(72) Inventors: Mark D. Randa, Summit, WI (US); Robert F. Crane, Oconomowoc, WI (US); Walter George Thompson, Janesville, WI (US)

(73) Assignee: Earth Tool Company LLC, Lake Mills, WI (US)

( * ) Notice: Subject to any disclaimer, the term of this patent is extended or adjusted under 35 U.S.C. 154(b) by 0 days.

(21) Appl. No.: 14/668,383

(22) Filed: Mar. 25, 2015

(65) Prior Publication Data

US 2015/0198279 A1    Jul. 16, 2015

Related U.S. Application Data

(63) Continuation-in-part of application No. 14/509,859, filed on Oct. 8, 2014.

(60) Provisional application No. 61/888,061, filed on Oct. 8, 2013.

(51) Int. Cl.
*F16L 55/18* (2006.01)
*B23D 21/14* (2006.01)
*F16L 55/165* (2006.01)
*B23D 21/02* (2006.01)
*E03F 3/06* (2006.01)

(52) U.S. Cl.
CPC ............. *F16L 55/18* (2013.01); *B23D 21/02* (2013.01); *B23D 21/14* (2013.01); *F16L 55/1658* (2013.01); *E03F 3/06* (2013.01)

(58) Field of Classification Search
CPC .......... B23D 21/02; B23D 21/14; F16L 55/18; F16L 55/1658; E03F 3/06

USPC ........................................................ 405/184.3
See application file for complete search history.

(56) References Cited

U.S. PATENT DOCUMENTS

| | | | | |
|---|---|---|---|---|
| 4,507,019 | A * | 3/1985 | Thompson | E21B 7/046 138/97 |
| 5,651,639 | A * | 7/1997 | Wentworth | F16L 55/1657 405/184 |
| 6,171,026 | B1 | 1/2001 | Crane et al. | |
| 6,896,077 | B1 * | 5/2005 | Gunsaulis | F16L 55/1658 175/106 |
| 8,292,545 | B2 | 10/2012 | Tjader | |
| 8,414,225 | B2 | 4/2013 | Tjader | |

(Continued)

OTHER PUBLICATIONS

Footage Tools Inc., "Wedge Trenchless Service Line Replacement", pages from website, 2013, 2 pages.

*Primary Examiner* — Benjamin Fiorello
(74) *Attorney, Agent, or Firm* — Tomlinson Rust McKinstry Grable

(57) ABSTRACT

An apparatus for replacing an existing pipe. The apparatus comprises a slitter and expander which surround a wire rope. The wire rope is attached to the expander, and the expander abuts either the slitter or a separation tube disposed between the expander and slitter, such that the slitter and expander are pivotable relative to each other. The apparatus is placed in a pipe to be replaced and pulled. While being pulled, blades on the slitter slit the pipe, while a sloped surface of the expander moves the slit sections apart into surrounding soil. A replacement pipe may be pulled by a pipe putter attached to the expander. A beacon may also be disposed within the apparatus to emit a signal for locating the apparatus white underground.

17 Claims, 13 Drawing Sheets

(56) References Cited

U.S. PATENT DOCUMENTS

| | | |
|---|---|---|
| 8,596,918 B2 | 12/2013 | Tjader |
| 2001/0018007 A1* | 8/2001 | Puttmann .................. E21B 7/30 405/184.3 |
| 2002/0081154 A1* | 6/2002 | Herrick ............... F16L 55/1658 405/184 |
| 2004/0218982 A1* | 11/2004 | Wentworth ............... E21B 7/30 405/184.3 |
| 2011/0079469 A1* | 4/2011 | Tjader ................. F16L 55/1658 184/14 |
| 2011/0081205 A1* | 4/2011 | Tjader .................... F16L 55/18 405/184.3 |
| 2011/0081206 A1* | 4/2011 | Tjader ................. F16L 55/1658 405/184.3 |
| 2011/0206462 A1* | 8/2011 | Sutton ................ F16L 55/1658 405/184.3 |
| 2014/0086689 A1 | 3/2014 | Tjader |
| 2014/0241813 A1 | 8/2014 | Tjader |
| 2015/0098765 A1 | 4/2015 | Randa et al. |
| 2015/0198279 A1 | 7/2015 | Randa et al. |
| 2015/0211672 A1 | 7/2015 | Tjader |

\* cited by examiner

PIPE SLITTING APPARATUS

CROSS REFERENCE TO RELATED APPLICATION

This application is a continuation-in-part of U.S. patent application Ser. No. 14/509,859, filed Oct. 8, 2014, which claims the benefit of provisional patent application Ser. No. 61/888,061 filed on Oct. 8, 2013, the entire contents of which are incorporated herein by reference.

FIELD

The present invention relates generally to the field of replacing existing utility lines, such as gas and water lines, through splitting and installing lines in the subsurface.

SUMMARY

The present invention is directed to an apparatus for expanding and replacing a pipe, The apparatus comprises a slitter, an expander, a beacon and a wire rope. The slitter comprises a tapered section having a first end and a second end, wherein the cross-sectional area of the first end is less than the cross-sectional area of the second end. The beacon assembly is disposed proximate the expander and generates a magnetic field.

In another embodiment the present invention is directed to a method for replacing an existing pipe. The method comprises placing a wire rope through the existing pipe, disposing a slitter about the wire rope at a first end of the existing pipe, disposing an expander about the wire rope at a first end of the existing pipe, the expander comprising a tapered section and a gripper, attaching the wire rope to the expander by moving the gripper to a gripping position, attaching a beacon to the expander, pulling the wire rope, slitter, expander, and beacon through the existing pipe from the first end to a second end, slitting the existing pipe with the slitter as the wire rope is pulled, emitting a magnetic field from the beacon, and expanding the slit existing pipe with the expander as the wire rope is pulled.

BACKGROUND

Pipe slitting is a process where an existing buried pipeline is separated longitudinally, expanded open circumferentially along with the surrounding soil and a new pipe is pulled in simultaneously as the slitting and expanding process is performed. Variations on the process include removal of the existing pipe prior to installation of the new (product) pipe; however most projects are performed with the slit host pipe remaining in the bore adjacent the product pipe.

A tensile structure such as a wire rope is pushed or fished through the host pipe and tooling capable of performing the combined slitting/pipe pulling process is attached to one end of the tensile pulling strand. A device capable of applying tension to the strand such as a hydraulic puller or even excavating equipment is coupled to the opposite end. A load is applied and the tooling is pulled along the path of the host pipe, through the ground.

There remains a need for quick attachment and removal mechanisms that satisfy the desire for an unobtrusive feature somewhere along the length of the tooling.

DESCRIPTION

Figure 1:
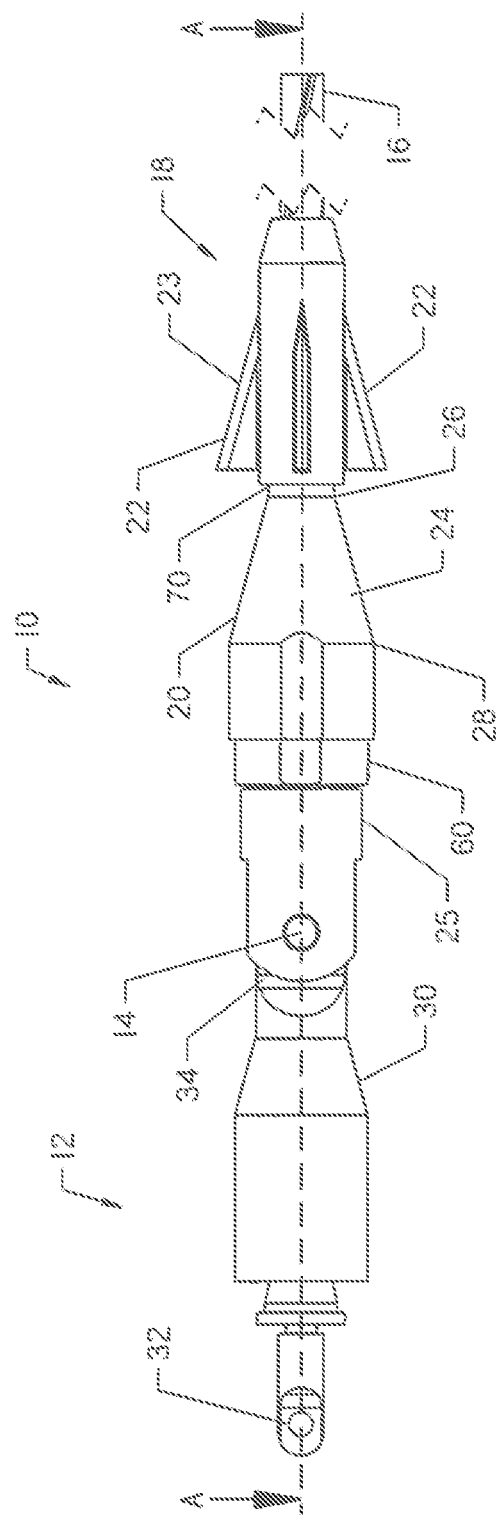
FIG. 1 is a side view of the pipe slitter and puller with a centered section line A-A

With reference now to the Figures in general and FIG. 1 in particular, shown therein is an apparatus for replacing a pipe, herein described as a pipe expander assembly 10. The pipe expander assembly 10 is attached at a first end to a pipe puller 12 by a connector 14. As shown, the connector 14 is a bolt. Other connectors 14 are considered, and one of ordinary skill in the art could additionally consider making the pipe puller 12 integral with the pipe expander 10. The pipe expander assembly 10 is attached at a second end to a tensile pulling member, or wire rope 16. The wire rope 16 is attached at a first end to the pipe expander assembly 10 and at a second end to a pulling member 206 (FIG. 11) such as a cable winch. The pipe expander assembly 10 comprises a slitter 18 and an expander 20. The slitter 18 comprises at least one blade 22. As shown, the slitter 18 comprises four blades 22. Each blade 22 comprises a honed edge 23 for slitting of a host pipe (not shown). The slitter 18 is positioned ahead of the expander 20 and is configured such that when placed within the host pipe, at least one blade 22 of the slitter will slit the host pipe wall. The blades 22 may run the length of the slitter 18, or only a portion of the length of the slitter as shown in FIG. 1.

Expander 20 comprises a tapered, or frusto-conical section 24, a jam nut 60, and a clevis 25. The frusto-conical section 24 increases in cross-sectional area from front 26 to back 28. The back 28 of the frusto-conical section 24 is preferably of greater cross-sectional area than the cross-sectional area of the host pipe, such that the host pipe and surrounding soil are expanded by pulling the expander assembly 10 through. The clevis 25 is attached to the pipe puller 12 by the connector 14, which as shown is a threaded bolt 14. The clevis 25 may rotate relative to the conic section 24 of the expander 20. The jam nut 60 is rotationally connected to the clevis 25 and may be threaded into the conic section 24 as will be described in greater detail with reference to FIGS. 3-5.

The pipe puller 12 comprises a tapered section 30 to reduce friction associated with pulling a trailing product pipe in a bore. The pipe putter 12 further comprises an eyelet 32 which allows connection to a tensile string (not shown) and a towing eye 34 for connection to the connector 14 and the expander 20. One of skill in the art will appreciate that the tensile string allows compression of the product pipe through its length by tensioning the string between eyelet 32 and the trailing end of the product pipe, aiding in prevention of a tensile fracture in the product pipe.

Figure 2:
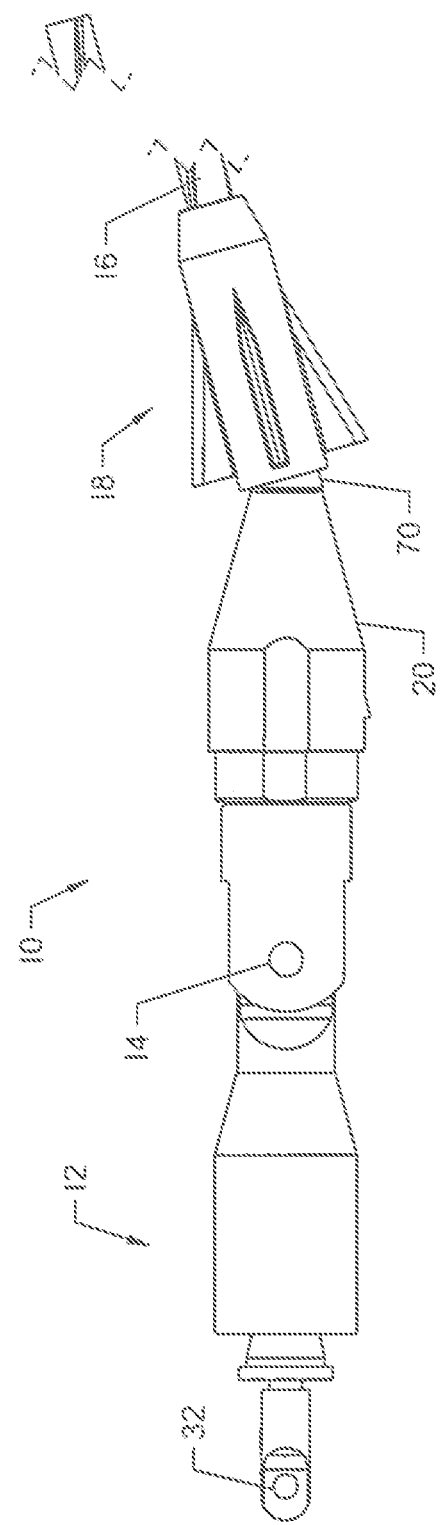
FIG. 2 is a pipe slitter and puller shown passing through a curving path of a host pipe.

As shown in FIG. 2, the slitter 18 and expander 20 may pivot relative to one another about a spherical joint 70, as host pipes may not always be straight. The slitter 18 is free to deflect angularly from the expander 20 and follow the path of a host pipe. The deflection between the slitter 18 and the expander 20 is effected by seating the slitter about the wire rope 16 without direct attachment to the wire rope or the expander 20. The expander 20 is internally attached to the wire rope 16 as will be described in further detail with reference to FIG. 3. In this way, the slitter 18 and expander 20 follow the path of the wire rope 16 without direct attachment between the two. This spherical joint 70 is shown in more detail in FIG. 3.

Figure 3:
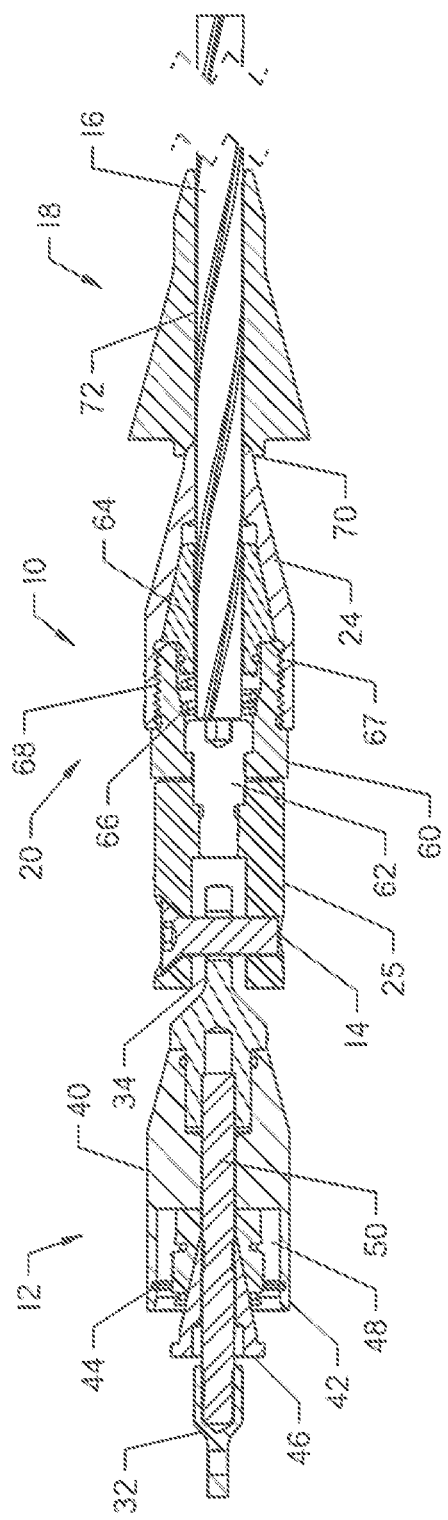
FIG. 3 is section A-A of FIG. 1 showing clamping of the device to a wire rope

With reference now to FIG. 3, shown therein is section A-A of FIG. 1. The pipe puller 12 further comprises a body 40, a sleeve 42, a set of puller jaws 44, a cone 46, an annulus 48 defined by the space between the jaws and the sleeve, and a rod 50. The rod 50 is mixedly attached to the eyelet 32 on a first end and the towing eye 34 on a second end. The rod 50 travels through the body 40 and is threadedly attached to the cone 46. The puller jaws 44 are disposed about the rod 50 within the annulus 48. As the cone 46 is moved along the rod 50 toward the second end of the rod, the puller jaws 44 expand outward within the annulus 48 toward the sleeve 42. Thus, rotation of the rod 50 while the cone 46 is rotationally fixed to the puller jaws 44 will cause the jaws to expand or contract, depending on the direction of thread and rotation. Further, pulling the rod 50 toward the expander 20 will similarly cause the puller jaws 44 to expand toward the sleeve 42.

Product pipe is attached to the pipe puller 12 by placing a product pipe within the annulus 48 and expanding the puller jaws 44 through use of the rod 50 as described above. Clamping force between the puller jaws 44 and sleeve 42 may hold the product pipe in place. As discussed above, a tensile force may be provided to a terminal end of the pipe through connection to a tensile member, such as a wire rope, at the eyelet 32. Alternatively, an adaptor (not shown) may be used to connect the pipe puller 12 to the product pipe, or the product pipe may be fused to the pipe puller 12.

The expander 20 comprises a jam nut 60, a swivel bolt 62, a gripper, or expander jaws 64, and a spring 66. The swivel bolt 62 allows the clevis 25 to rotate relative to the jam nut 60 and conic section 24. Therefore, relative rotation between the product pipe (and therefore pipe puller 12) and wire rope 16 is accommodated. The expander jaws 64 are disposed inside the conic section 24 about the wire rope 16 and movable between a first position and a second position. In the first position, as shown in FIG. 3, the expander jaws 64 are engaged with the wire rope 16 such that the wire rope is connected to the expander jaws and the expander 20. In the second position, shown in more detail with reference to FIG. 5 below, the expander jaws 64 do not engage the wire rope 16, allowing the expander 20 to slide relative to the wire rope. The interior of the conic section 24 comprises threads 67 that mate with lands 68 on the exterior of the jam nut 60.

Alternatively, jam nut 60 and the conic section 24 may connect through a bolted, fused, quick-attach or other known connection method.

As the jam nut 60 is threaded to the conic section 24, the expander jaws 64 are forced to grip the wire rope 16 and thus moved from the second position to the first position. The action of tightening jam nut 60 couples the expander assembly 20 to the wire rope 16. The spring 66 is disposed within jam nut 60 and places a load on expander jaws 64 to keep expander jaws confined within the interior of the conic section 24.

As shown, the slitter 18 comprises a channel 72 for the wire rope 16 to pass within. Preferably, the channel 72 is sized to the wire rope 16 such that movement of the slitter 18 relative to the wire rope 16 is limited. The slitter 18 is not directly attached to the wire rope 16, but is forced forward by the expander 20 at the spherical joint 70 when the wire rope pulls on the expander at the expander jaws 64. Thus, the slitter 18 has 360 degrees of angular deflection about the spherical joint 70.

Figure 4:
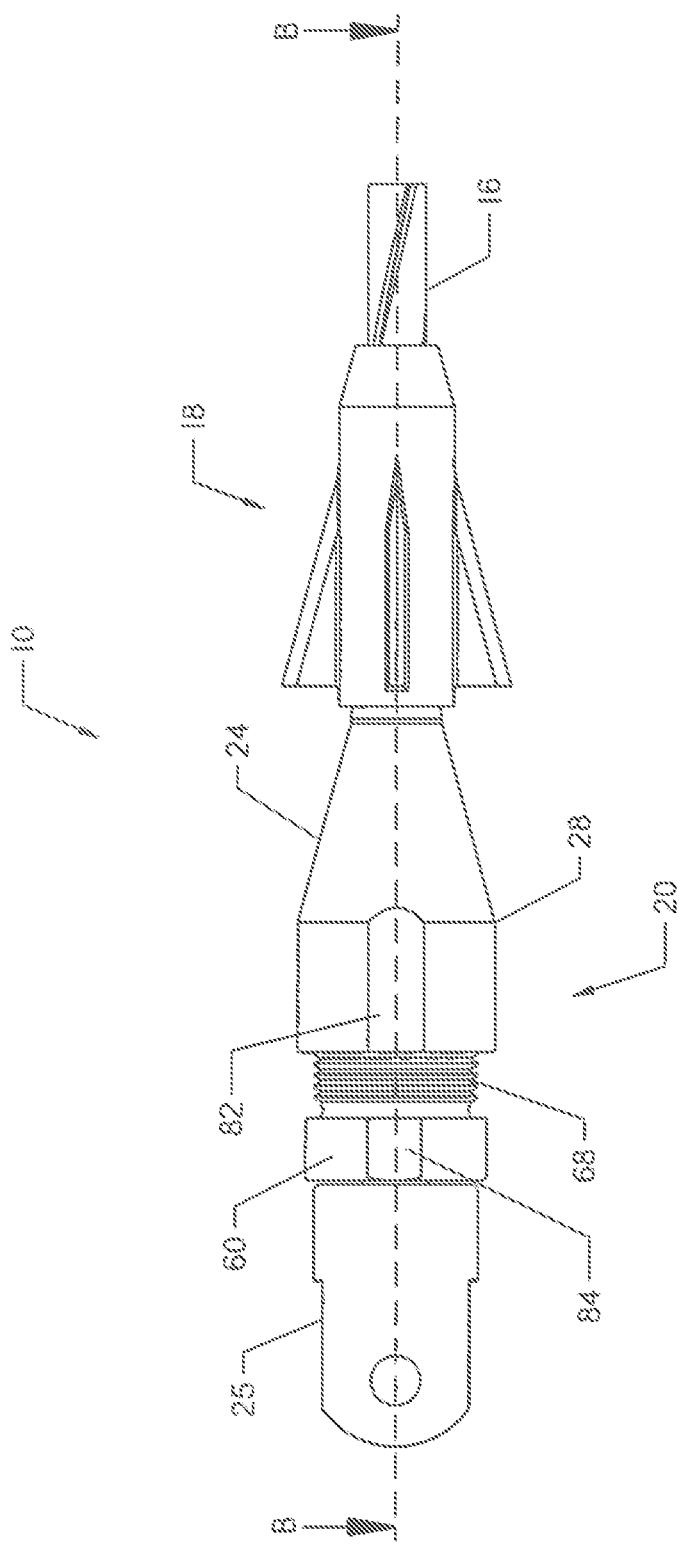
FIG. 4 is a side view of the pipe slitter and puller surrounding a wire rope in a disassembled condition and section line B-B along the centerline.

FIG. 4 is a side view of the pipe expander assembly 10 of FIGS. 1-3 with the pipe puller removed. In FIG. 4, the jam nut 60 has been backed out of section 24, revealing the lands 68 and placing the expander jaws 64 (FIG. 5) in the second position. Attachment of the expander 20 to the wire rope 16 can thus be illustrated. The expander 20 comprises wrench flats 82 on the back 28 of the conic section 24 and jam nut 60 flats 84 are used to tighten or loosen jam nut into or out of the conic section 24. To assemble shown components, first the slitter 18 is piloted over the wire rope 16 and slipped forward. Then expander assembly 20, with the jam nut 60 threaded out as shown is placed over the end of wire rope 16 with the expander jaws 64 (FIG. 5) in the second position.

Figure 5:
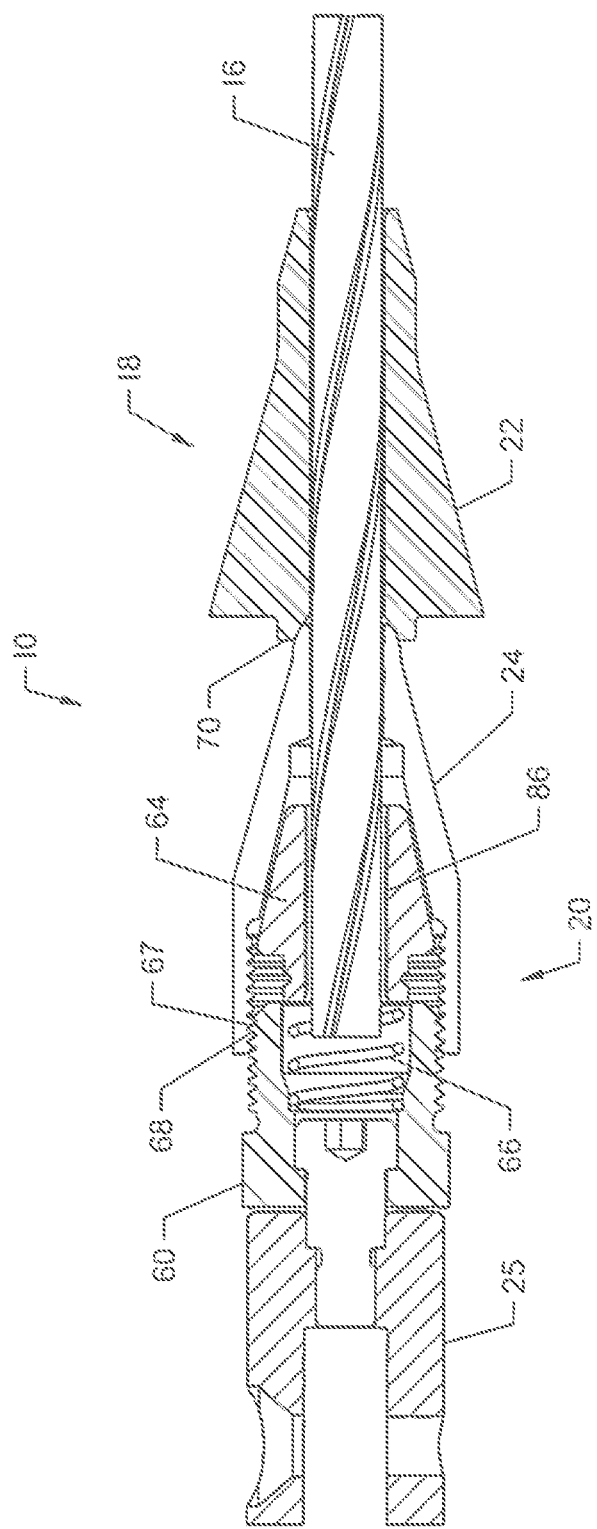
FIG. 5 is section B-B shown with the pipe slitter decoupled from a wire rope.

With reference now to FIG. 5, the expander jaws 64 comprise a gripping surface 86 for biting into surface of the wire rope 16. The gripping surface 86 may comprise serrations, teeth, or other known grippers. The gripping surface 86 engages with the wire rope 16 when the jam nut 60 is engaged such that the expander jaws are in the first position due to a reduction of the space disposed within the gripping surface. Conversely, as shown in FIG. 5, the gripping surface 86 will not bite into the surface of wire rope 16 when the jam nut is not engaged and the expander jaws 64 are in the second position. Therefore when the jaws 64 are in the second position, slitter assembly 18 and expander 20 will be free to slide off of wire rope 16.

In operation, the wire rope 16 is disposed through the existing pipe (not shown). The slitter 18 is placed onto the wire rope, followed by the conic section 24 of the expander 20. The expander jaws 64 are then moved from the second position to the first position by threading of the jam nut 60 into the conic section 24. The pipe puller 12 is attached to connector 14. A new pipe is optionally placed within the pipe puller as described above, if replacement of the existing pipe is desired. The wire rope 16 is then pulled through the existing pipe, causing the blades 22 of the slitter 18 to slit the pipe, the conic section 24 of the expander 20 to expand the pipe, and the new pipe to be pulled into place along substantially the same path as the existing, slit pipe. The new pipe is then disconnected from the pipe puller 12 when the wire rope is pulled all the way through the existing pipe.

Figure 6:
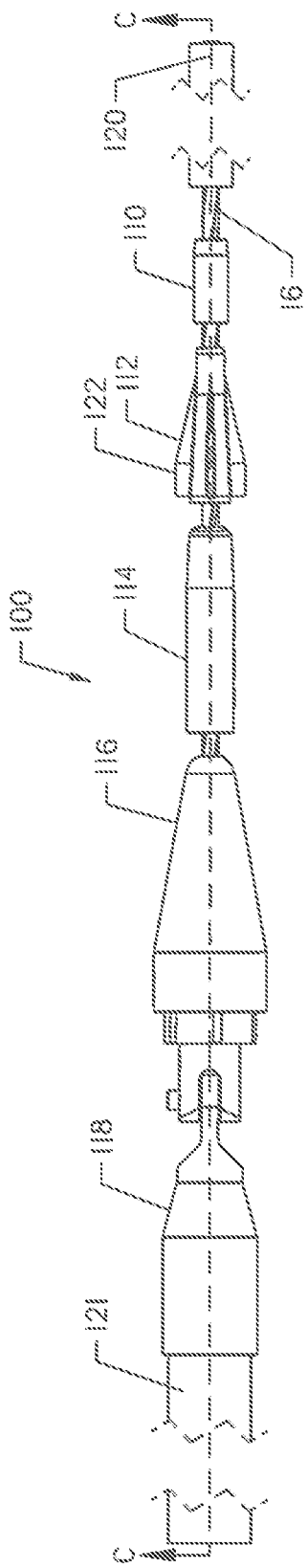
FIG. 6 is a top view of an alternative pipe slitter and puller.

With reference now to FIG. 6, an alternative embodiment of a pipe expander assembly 100 is shown. In FIG. 6, the pipe expander assembly 100 comprises a pilot 110, a slitter 112, a separation tube 114, an expander 116 and a pipe puller 118. The pilot 110 surrounds wire rope 16 and guides the expander assembly 100 into a host pipe 120. The slitter 112 comprises blades 122 similar to slitter 18 of the previous embodiment. As shown, four blades 122 are displaced rotationally in 90 degree increments.

The separation tube 114 provides distance between the slitter 112 and the expander 116 for optimal pipe expansion. The separation tube 114 may be flexible, and may be of a length chosen for optimal distance between the expander 116 and the slitter 112 for a particular pipe expansion application. Expander 116 and pipe puller 118 perform the same task as expander 20 and pipe puller 12 with reference to FIG. 1. Pipe puller 118 is shown with trailing product pipe 121 attached as described with reference to FIG. 3.

While FIG. 6 shows separation between each of the pilot 110, slitter 112, separation member 114, and expander 116, it should be appreciated that interaction between these members and the host pipe 120 will cause each member to abut the adjacent member as the pilot, slitter and separation member are forced towards the expander.

Figure 7:
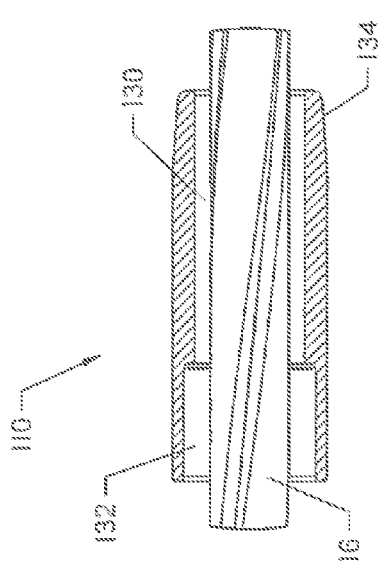
FIG. 7 is section C-C of the pilot section of the alternative pipe slitter of FIG. 6.

With reference now to FIG. 7, section C-C of pilot 110 is shown therein surrounding wire rope 16. The pilot comprises a central bore 130, a counterbore 132 and a tapered nose 134. The tapered nose 134 reduces the likelihood of the pilot to hang on obstructions internal within a host pipe 120 (FIG. 6). Preferably, a maximum outside diameter of the pilot is 75% to 99.9% of an inside diameter of the host pipe. The counterbore 132 allows the tapered nose 142 (FIG. 8) of the slitter 112 to fit partially within the pilot 110.

Figure 8:
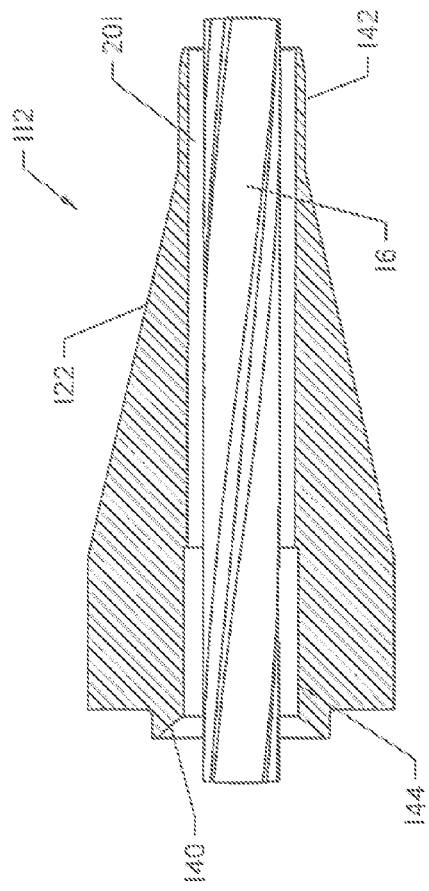
FIG. 8 is section C-C of the slitter section of the alternative pipe slitter of FIG. 6.

With reference to FIG. 8, slitter 112 is shown therein surrounding wire rope 16 along section C-C of FIG. 6. The slitter 112 comprises a spherical socket 140 and a nose 142. The nose 142 fits within the counterbore 132 of the pilot 110. The spherical socket 140 allows the separation tube 114 (FIG. 6) to abut the slitter 112. The slitter 112 is substantially similar to the slitter 18 of FIG. 1, having the wire rope 16 passing through internal passage 144 and blades 12 to slit the host pipe 120 (FIG. 6).

Figure 9:
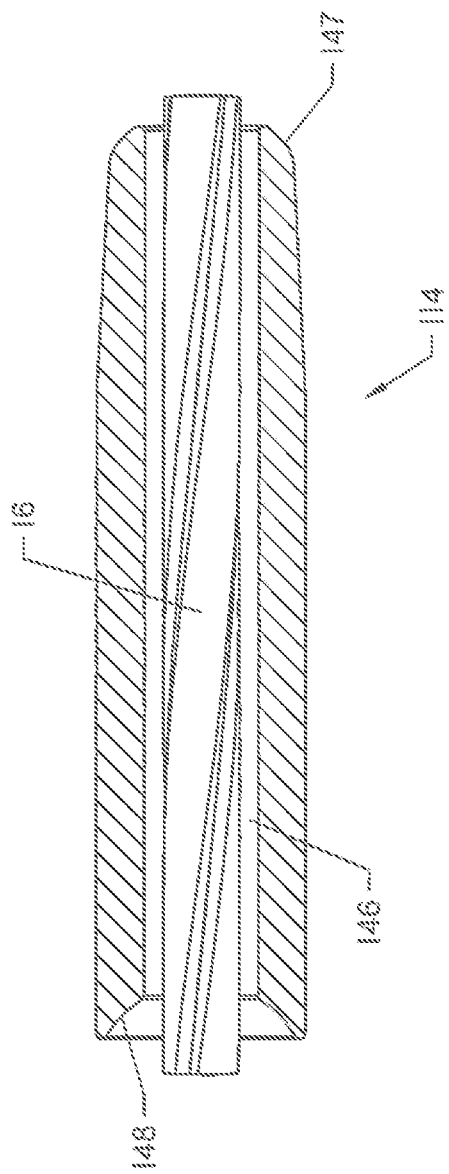
FIG. 9 is section C-C of the separation tube section of the alternative pipe slitter of FIG. 6.

With reference now to FIG. 9, separation tube 114 is shown therein surrounding wire rope 16 along section C-C of FIG. 6. The separation tube comprises an internal passageway 146, a tapered nose 147, and a spherical socket 148. The tapered nose 147 is adapted to abut the spherical socket 140 of slitter 112 (FIG. 8), while the spherical socket 148 of the separation tube 114 abuts a spherical nose of the expander 116 (FIG. 6). In this way, the pilot tube 110, slitter 112, separation tube 114 and expander 116 each have two axes of pivotal movement related to any adjacent component. The separation tube 114 may be of any length or diameter appropriate for providing separation between the slitter 112 and the expander 116. Separation may be desired between the slitter 112 and expander 116 when the profile of the slit pipe (not shown) is curved away from the pipe expander assembly 100 immediately after slitting, but curves back in some distance later. Providing the separation tube 114 enables this distance to be modified based on pipe 120 characteristics and soil conditions.

Figure 10:
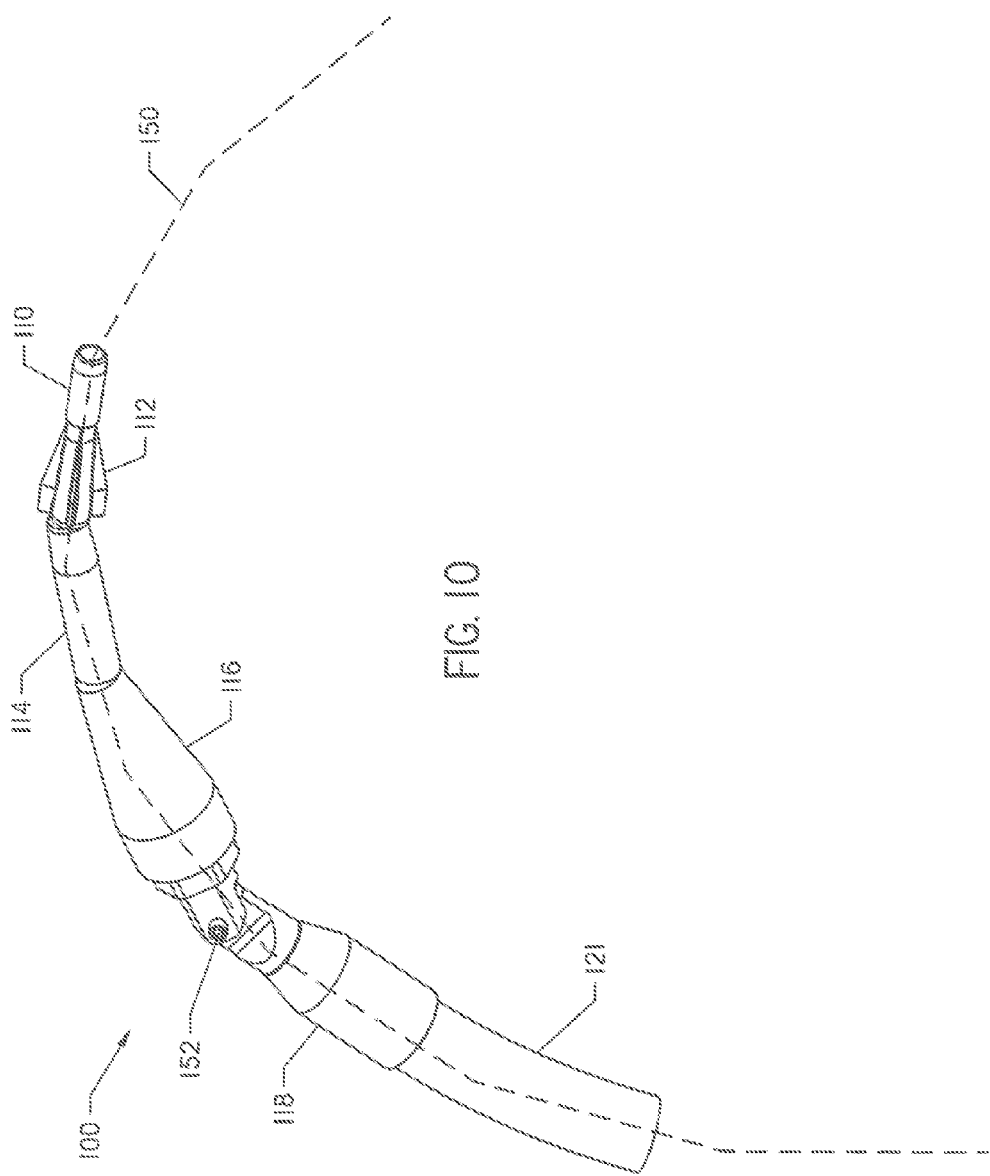
FIG. 10 is a perspective view of the alternative pipe slitter of FIG. 6 pulling a product pipe.

With reference now to FIG. 10, the pipe expander assembly 100 is shown having a curved disposition as if being pulled through a curved host pipe (not shown) having an axis represented by line 150. Such curved orientation is made possible by spherical joints between each component of the pipe expander assembly 100 forward of the expander 116 and clevis joint 152. As shown, the connection between the expander 116 and pipe puller 118 is a clevis joint 152. Trailing product pipe 121 is thus installed along a path approximating line 150.

Figure 11:
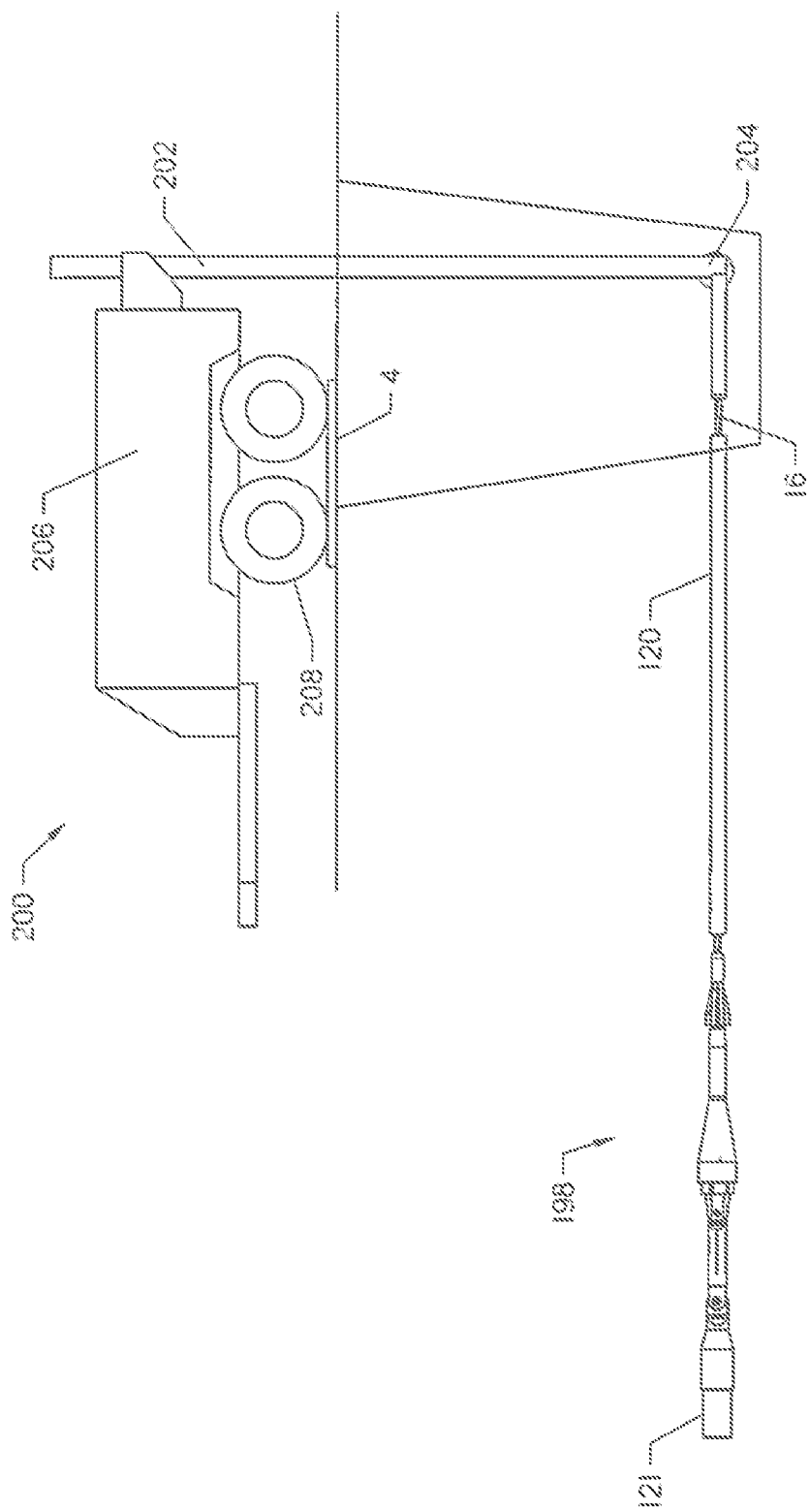
FIG. 11 is a diagrammatic representation of a support frame used when pulling a pipe slitter. The pipe slitter shown in FIG. 11 is an alternative embodiment of the invention.

With reference now to FIG. 11, a support assembly 200 for operating a pipe expander assembly 198 is shown. One of ordinary skill can appreciate that the pipe expander assemblies 10, 100 of the previous figures may also be utilized with the support assembly 200. The support assembly 200 comprises a mast 202, sheave 204, and winch assembly 206 supported on a trailer 208. The mast 202 passes the wire rope 16 from the winch assembly 206 to the sheave 204. The sheave 204 redirects the wire rope 16 into the host pipe 120. The pipe expander assembly 198 is by the wire rope 16 through the host pipe 120 by the winch assembly 206. The trailer 208 allows the winch assembly 206 and other portions of the support assembly 200 to be transported to and from a job site. The winch assembly 206 will be shown in more detail with reference to FIG. 14 below.

Figure 12:
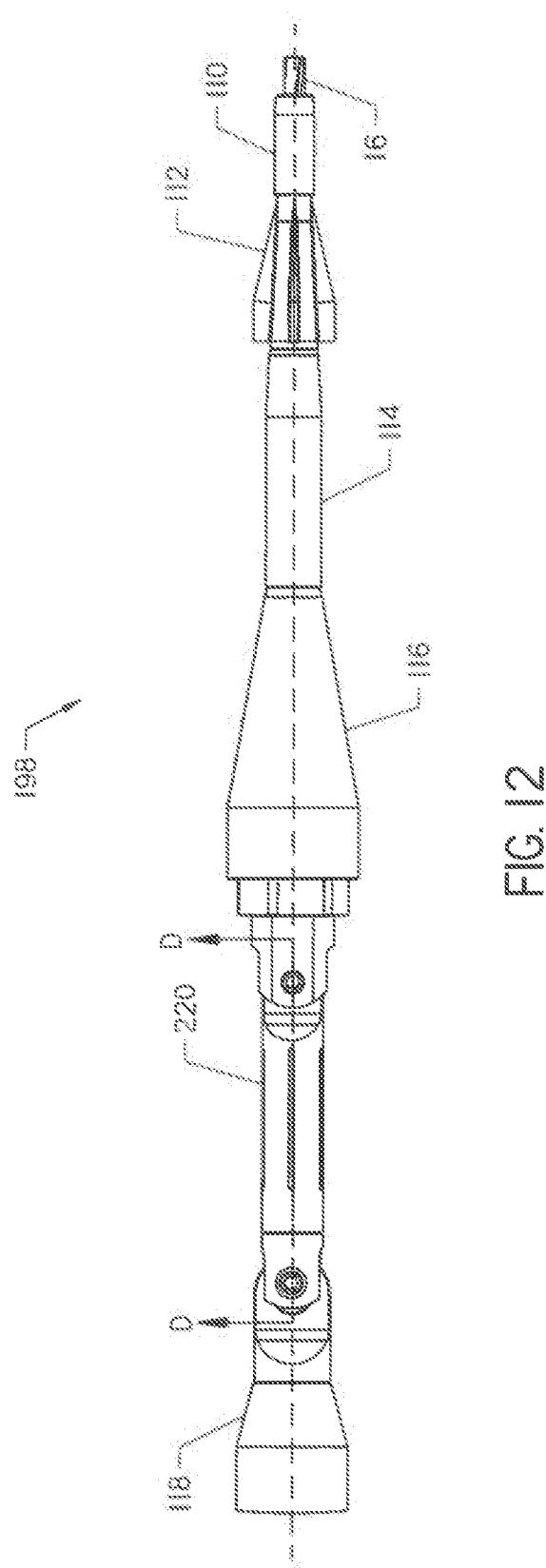
FIG. 12 is a top view of the pipe slitter shown in FIG. 11

With reference now to FIG. 12, the pipe expander assembly 198 is shown with a pilot member 110, slitter 112, separation member 114, an expander 116 and a pipe puller 118 as disclosed with reference to FIG. 6 above. Additionally, as shown in FIG. 11, the pipe expander assembly further comprises a beacon assembly 220. The beacon assembly 220 emits a transmission capable of passing through subsurface.

Figure 13:
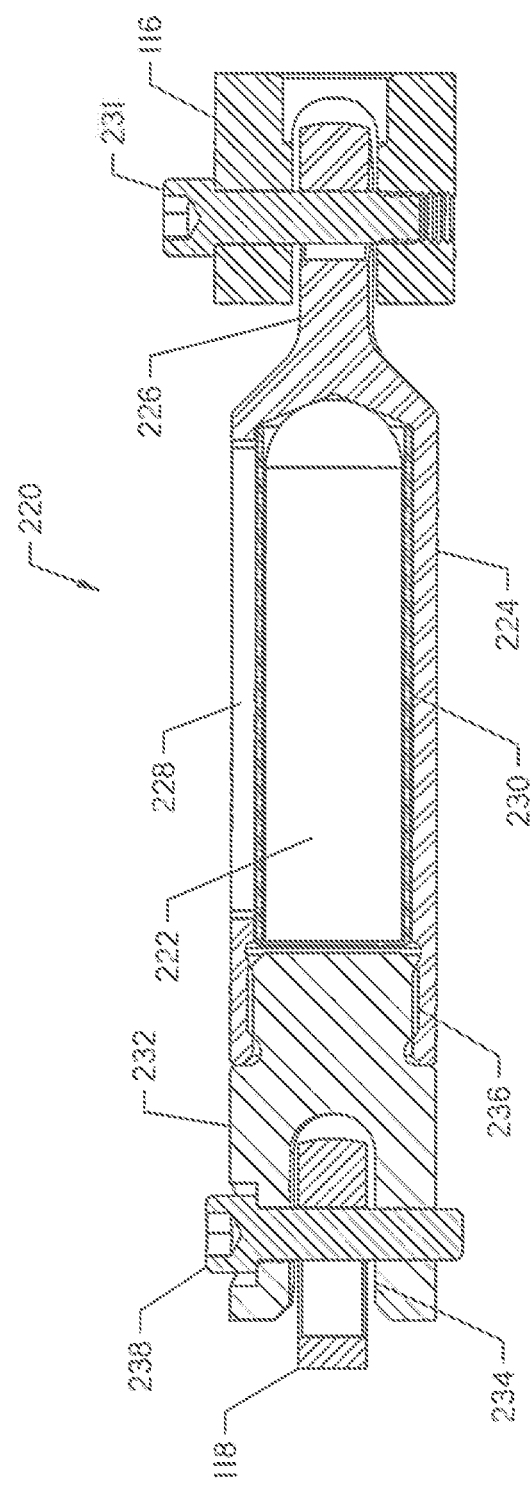
FIG. 13 is section D-D of the beacon assembly of the pipe slitter of FIG. 12.

With reference now to FIG. 13 which is section D-D of FIG. 11, the beacon assembly 220 comprises a beacon 222 and a body 224 with a towing eye 226. Longitudinal slots 228 are formed in the body 224 to allow the signal generated by the beacon 222 to be emitted from the body. In a preferred embodiment, five slots 228 are utilized in the body 224. The beacon assembly 220 further comprises a protective sleeve 230 surrounding the beacon to protect the beacon during operation of the expander assembly 198. The sleeve 230 may be made of a protective electromagnetically transparent material such as plastic. The towing eye 226 allows connection to the expander 116 through use of a bolt 231 or other attachment means.

The body 224 is attached to a rear cap 232 that comprises a clevis 234. The rear cap 232 is threaded into the body 224 using threads 236 or may comprise a pinned connection (not shown) or other connection mechanism. The rear cap 232, when removed from the body 224, allows access to the beacon 222 within the beacon assembly 220. The clevis 234 is provided for attachment to the pipe puller 118 using a bolt 238 or other connective mechanism.

In operation, the beacon 222 transmits a signal, such as a radio, Bluetooth, infrared, magnetic, or other transmission, to an above ground receiver, or tracker. Methods and apparatus for tracking an underground beacon are known in the horizontal directional drilling (HDD) field, and such methods and apparatus are shown in U.S. Pat. No. 7,624,816 issued to Cole, et. al., U.S. Pat. No, 8,482,286, issued to Cole, and U.S. Pat. No. 8,829,906, issued to Gard, et. al, the entirety of which are incorporated herein by reference.

Figure 14:
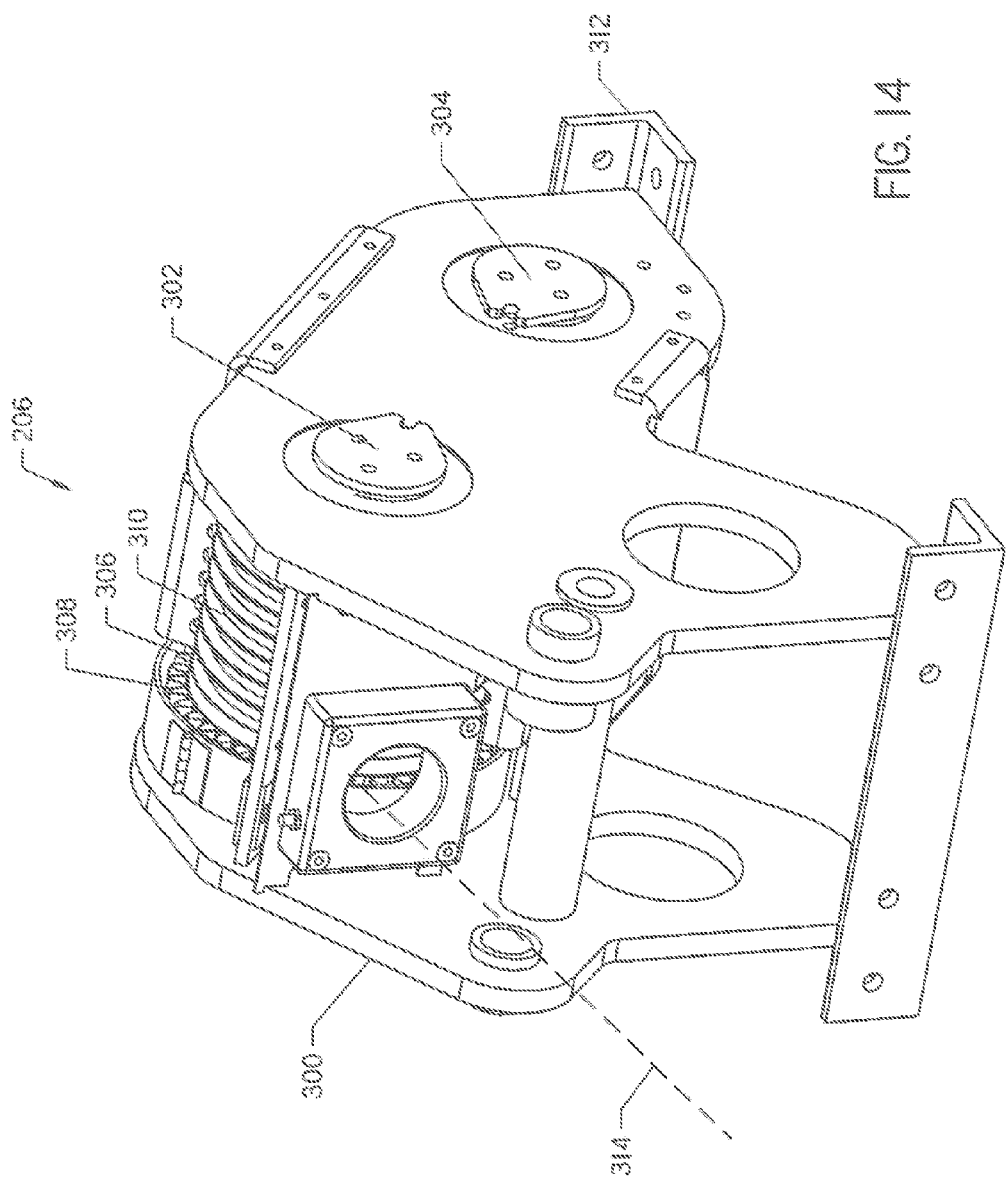
FIG. 14 is a perspective view of a capstan winch for use with the support frame of FIG. 11.

With reference now to FIG. 14, the winch assembly 206 of FIG. 10 comprises a capstan 300. The capstan 300 comprises an upper bullwheel axle 302 and a lower bullwheel axle 304, each of which support a bullwheel, such as upper bullwheel 306. Lower bullwheel is not shown in FIG. 13. The upper bullwheel 306 comprises a bullgear 308 and grooves 310. Hydraulic motors (not shown) or other motive force devices turn the bullgear 308 of both bullwheels, causing the wire rope (not shown) to be forced by friction in a direction by the grooves 310. Mounting feet 312 are provided for attachment to the support assembly 200 (FIG. 10). Axis 314 represents the position of wire rope 16 (FIG. 10) when in use with capstan 300.

One of ordinary skill in the art will appreciate that while the Figures show one configuration for the subject invention, modifications to the particular shape and organization of the pipe expander assembly 10 may be taken without departing from the spirit of the disclosed invention. For example, the slitter 18 may be integrally formed with the expander rather than abutting the expander at the cylindrical joint. Likewise, the pipe puller 12 may be integrally formed rather than connected at a clevis joint.

What is claimed is:

1. An apparatus for replacing a pipe comprising:
a slitter comprising a blade;
an expander comprising a frusto-conical section;
a pilot member disposed about the wire rope and abutting a front end of the slitter;
separation member disposed about the wire rope between the slitter and the expander;
a wire rope disposed within the slitter and the frusto-conical section, wherein the wire rope is held and attached to the expander;
a beacon assembly disposed proximate the expander, wherein the beacon assembly emits a magnetic field; and
a pipe puller assembly attached at a first end to the beacon assembly and at a second end to a replacement pipe.

2. The apparatus of claim 1 wherein the expander is disposed partially within the slitter.

3. The apparatus of claim 1 wherein expander comprises a gripper, wherein the gripper defines a smaller cross-sectional area when in a gripping position than when the gripper is in a non-gipping position such that the gripper grips the wire rope in the gripping position.

4. The apparatus of claim 1 further comprising a cable winch attached to the wire rope.

5. The apparatus of claim 1 wherein the pipe puller assembly comprises:
a sleeve;
a rod disposed within the sleeve and rotationally movable relative to the sleeve;
a cone threadedly disposed about the rod; and
jaws disposed about the cone such that the jaws are movable between an expanded position and a retracted position by threaded movement of the cone along the rod.

6. The apparatus of claim 5 wherein the replacement pipe is attached to the pipe puller when the jaws are in the expanded position.

7. The apparatus of claim 6 further comprising:
a cable winch attached to the wire rope;
a pilot member located on a first side of the slitter; and
a separation tube located on a second side of the slitter and abutting the expander.

8. The apparatus of claim 1 wherein the beacon assembly is attached to the pipe puller assembly by a clevis and bolt.

9. The apparatus of claim 1 wherein the slitter is disposed partially within the pilot, the separation member is disposed partially within the slitter, and the expander is disposed partially within the separation member.

10. The apparatus of claim 1 wherein the slitter at least one blade, the blade having a length that is less than a length of the slitter.

11. The apparatus of claim 1 further comprising an above ground tracker for detecting the magnetic field.

12. A method for replacing an existing pipe comprising:
placing a wire rope through the existing pipe;
disposing a slitter about the wire rope at a first end of the existing pipe;
disposing a separation member about the wire rope between the expander and the slitter before slitting the existing pipe;
disposing an expander about the wire rope at a first end of the existing pipe, the expander comprising a tapered section and a gripper;
attaching the expander to a pipe fuller; and
attaching a new pipe to the pipe puller;
attaching the wire rope to the expander by moving the gripper to a gripping position;
attaching a beacon to the expander;
emitting a magnetic field from the beacon;
pulling the wire rope to move the slitter, expander, and beacon through the existing pipe from the first end to a second end;
slitting the existing pipe with the slitter; and
expanding the existing pipe with the expander.

13. The method of claim 12 wherein the expander further comprises a jam nut, wherein the gripper is disposed between the jam nut and the tapered section, the method further comprising:
moving the gripper to a gripping position by moving the jam nut toward the tapered section.

14. The method of claim 13 further comprising:
moving the jam nut away from the tapered section after the wire rope is pulled through the existing pipe; and
removing the expander and slitter from the wire rope.

15. The method of claim 12 further comprising detecting the magnetic field at an above ground location to determine a location of the beacon.

16. The method of claim 12 wherein the slitter has two axes of pivotal movement relative to the expander.

17. An apparatus for replacing a pipe comprising:
a slitter comprising a blade;
a separation member abutting the slitter at a first end;
an expander comprising:
a frusto-conical section having a first end and a second end;
a jam nut connectable to the frusto-conical section; and
a gripper disposed between the frusto-conical section and the jam nut, movable between a pipping position and a non-gripping position; and
a wire rope disposed within the slitter and the frusto-conical section, wherein the wire rope is held by the gripper when the gripper is the gripping position;
a beacon assembly attached to the expander to emit a magnetic signal; and
a pipe puller assembly attached at a second end to a replacement pipe and at a first end to the beacon assembly, the pipe puller assembly comprising:
a sleeve;
a rod disposed within the sleeve and rotationally movable relative to the sleeve;
a cone threadedly disposed about the rod; and
jaws disposed about the cone such that the jaws are movable between an expanded position and a retracted position by threaded movement of the cone along the rod.

* * * * *

UNITED STATES PATENT AND TRADEMARK OFFICE
CERTIFICATE OF CORRECTION

PATENT NO. : 9,512,951 B2  
APPLICATION NO. : 14/668383  
DATED : December 6, 2016  
INVENTOR(S) : Randa et al.

Page 1 of 1

It is certified that error appears in the above-identified patent and that said Letters Patent is hereby corrected as shown below:

On the Title Page

In the Abstract

Line 10, please delete "putter" and insert therefore --puller--.
Line 12, please delete "white" and insert therefore --while--.

In the Specification

Column 2, Line 24, after "11" please insert --.--.
Column 3, Line 3, please delete "putter" and insert therefore --puller--.
Column 5, Line 35, please delete "12" and insert therefore --122--.

In the Claims

Column 7, Line 15, before the word "separation" please insert --a--.
Column 7, Line 30, please delete "non-gipping" and insert therefore --non-gripping--.
Column 8, Line 11, please delete "fuller" and insert therefore --puller--.
Column 8, Line 44, please delete "pipping" and insert therefore --gripping--.

Signed and Sealed this
Seventh Day of February, 2017

Michelle K. Lee
*Director of the United States Patent and Trademark Office*